UNITED STATES PATENT OFFICE.

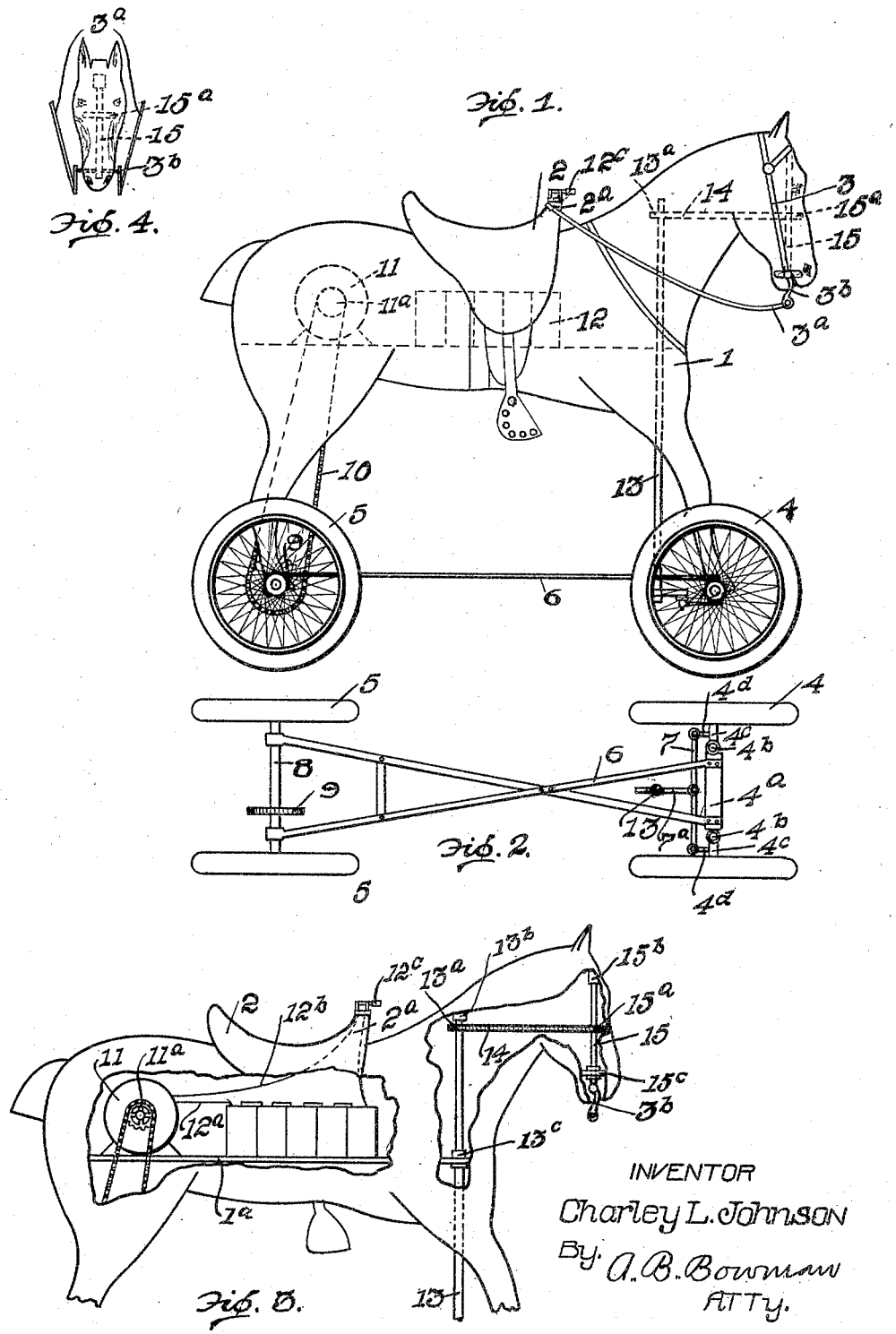

CHARLEY L. JOHNSON, OF SAN DIEGO, CALIFORNIA, ASSIGNOR TO ELECTRIC HORSE MANUFACTURING AND AMUSEMENT CO., OF PHOENIX, ARIZONA, A CORPORATION OF ARIZONA.

MOTOR-PROPELLED HORSE.

1,308,425.     Specification of Letters Patent.     Patented July 1, 1919.

Application filed December 26, 1916. Serial No. 138,822.

*To all whom it may concern:*

Be it known that I, CHARLEY L. JOHNSON, a citizen of the United States, residing at San Diego, in the county of San Diego and State of California, have invented certain new and useful Improvements in Motor-Propelled Horses, of which the following is a specification.

My invention relates to a mechanical horse that is propelled by means of a motor which derives its power from a battery, and the objects of my invention are, first, to provide a vehicle in the form of a horse for the purpose of traveling about, which is easy to operate, guide and control; second, to provide a device of this class which is guided by the reins, by the driver similar to the guiding of a horse; third, to provide a device of this class which is operated by a motor which motor receives its power from a battery; fourth, to provide a device of this class which is simple and economical of construction, durable, easy to operate and will not readily deteriorate or get out of order.

With these and other objects in view as will appear hereinafter, my invention consists of certain novel features of construction, combination and arrangement of parts as will be hereinafter set forth, reference being had to the accompanying drawings and to the characters of reference thereon which form a part of this specification in which:

Figure 1 is a side elevational view of my device complete. Fig. 2 is a plan view of the truck portion of my device. Fig. 3 is a fragmentary side elevational view of the horse with portions broken away to facilitate the illustration, and Fig. 4 is a front view of the head portion of the horse.

Similar characters of reference refer to similar parts throughout the several views.

The horse body 1, saddle 2, bridle 3, front wheels 4, rear wheels 5, frame 6, guiding bar 7, rear axle 8, sprocket 9, chain 10, motor 11, battery 12, vertical guiding shaft 13, chain 14 and shaft 15 constitute the principal parts of my device.

The body 1 is shaped like a horse and it is preferably a metallic shell, hollow throughout, and it is provided with a saddle 2 for supporting the rider. It is also provided with a bridle 3 with reins $3^a$ secured to a bit $3^b$. The legs are secured to the front and rear axles $4^a$ and 8 and the rear axle is supported by means of the wheels 5 to which said axle 8 is secured. The front wheels 4 are pivotally secured to the axle $4^a$ by means of pivotal joints $4^b$ and arms $4^c$ extending from said joints to the wheels. Mounted on these arms $4^c$ are backwardly extending arms $4^d$ to which is pivotally mounted at each of its ends the bar 7. To this bar 7 is pivotally connected the bar $7^a$ which is slidably mounted in a hole in the lower end of vertical shaft 13. Said shaft extends upwardly through the front portion of the body 1 and on its upper end is rigidly secured a sprocket $13^a$. This shaft 13 is supported by means of bearings $13^b$ and $13^c$. Revolubly mounted in the head of the body 1 and secured to the bit $3^b$ is a vertical shaft 15 parallel with the shaft 13 supported by bearings $15^b$ and $15^c$, and mounted on said shaft 15 in line with the sprocket $13^a$ is the sprocket $15^a$ and mounted on these two sprockets $13^a$ and $15^a$ is the chain 14 engaging the teeth of the sprockets so that when the bit $3^b$ is rotated slightly by pulling on the reins $3^a$ the shaft 15 is rotated, rotating in turn the sprockets $15^a$ which move the chain 14 revolving the shaft 13 which moves the rods $7^a$ and 7 turning the wheels 4. Mounted centrally in the body is a battery 12 and back of the battery in the rear portion of the body 1 is a motor 11 which is provided with a sprocket $11^a$ upon which is mounted the chain 10 which extends to and engages with the teeth of the sprocket 9 on the rear axle 8. The motor 11 is connected to the battery 12 by circuit conductors $12^a$ and $12^b$, the circuit conductors $12^b$ extending to the horn $2^a$ of the saddle and in said conductor $12^b$ is provided a switch $12^c$ secured to the horn of the saddle and in a position so that the rider can readily operate said switch and readily turn on and off the current between the battery and the motor. The motor and battery are supported by means of the longitudinal support $1^a$ and the axles $4^a$ and 8 are connected by means of the frame 6.

Though I have shown and described a particular construction, combination and arrangement of parts, I do not wish to be limited to this particular construction, combination and arrangement, but desire to include in the purview of my invention the construction, combination and arrangement substantially as set forth in the appended claims.

It is obvious that with this construction there is provided a mechanical horse which is propelled by a motor which may be used for the purpose of traveling about, which is guided very similar to the guiding of a horse and which is controlled from the saddle horn for controlling its movements, that the structure is simple and economical of construction, durable, easy to operate and will not readily deteriorate or get out of order.

Having thus described my invention, what I claim as new and desire to secure by Letters Patent is:

1. In a device of the class described, the combination with a motor propelled horse mounted upon a carriage of means for steering the same consisting of a vertical shaft in the head of said body, a horizontal bar secured on the lower end thereof, reins with their extended ends secured to the opposite ends of said bar, another vertical shaft revolubly mounted in said body, means operatively connecting said shafts and means connecting the lower end of said shaft that is mounted in the body with the front wheel of the carriage.

2. In a device of the class described, the combination of a body in the form of a horse, a carriage upon which said body is secured, means for propelling said carriage, means for steering the same comprising a vertical shaft in the head of said body, a horizontal bar secured on the lower end thereof, reins with extended ends secured to the opposite ends of said bar, another vertical shaft revolubly mounted in said body parallel therewith, a chain connecting said shafts and means connecting the lower end of said latter mentioned shaft with the front wheels of the carriage.

In testimony whereof, I have hereunto set my hand at San Diego, California, this 13th day of November, 1916.

CHARLEY L. JOHNSON.

Copies of this patent may be obtained for five cents each, by addressing the "Commissioner of Patents, Washington, D. C."